March 4, 1941.  W. F. GROENE  2,233,977
TOOL FEEDING MECHANISM FOR LATHES
Filed July 24, 1939  10 Sheets-Sheet 1
FIG. I
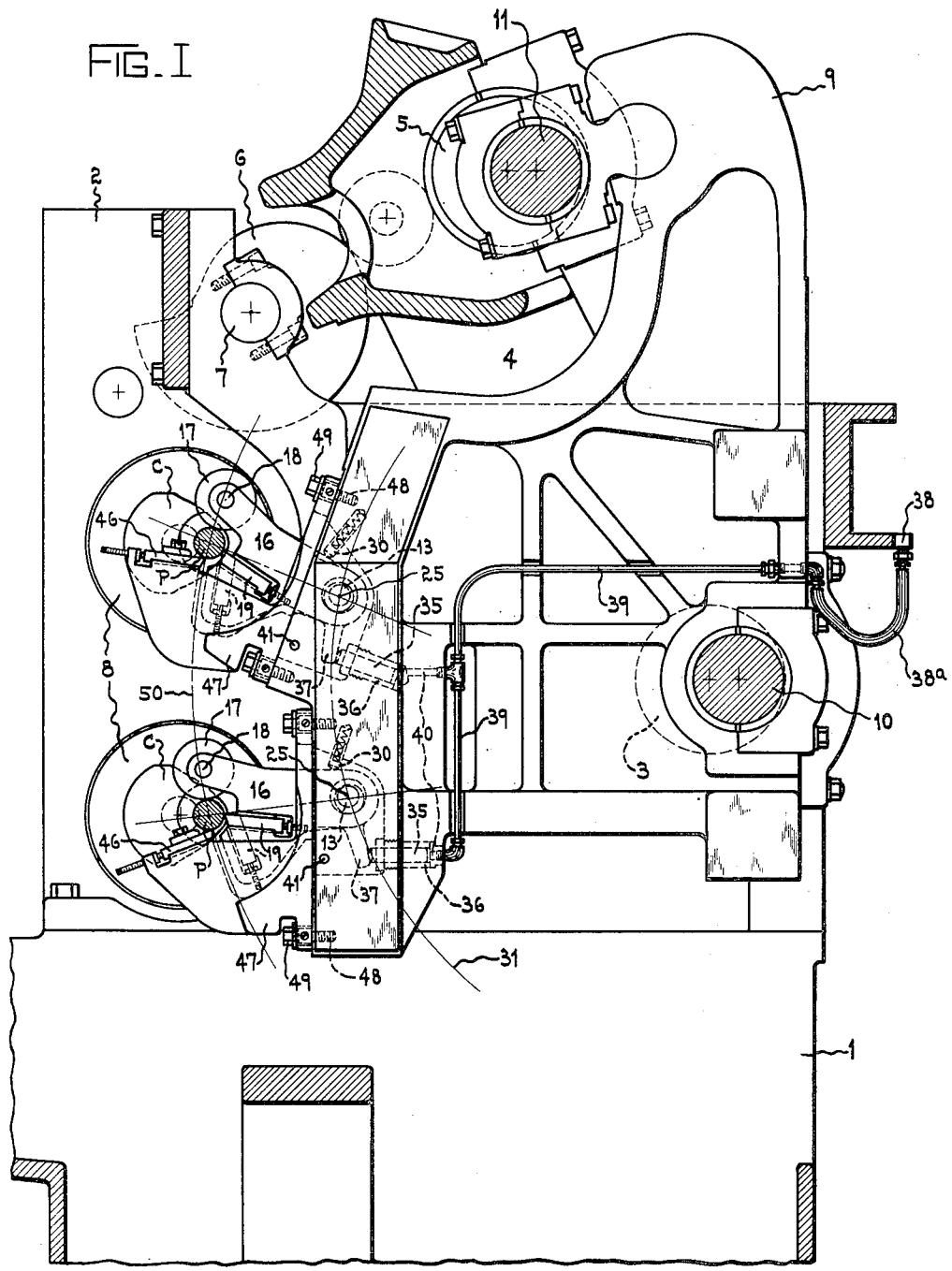
WITNESS.
Orlando S. Knof
INVENTOR.
WILLIAM F. GROENE
BY William S. Groene
ATTORNEY.

March 4, 1941. W. F. GROENE 2,233,977
TOOL FEEDING MECHANISM FOR LATHES
Filed July 24, 1939 10 Sheets-Sheet 2
FIG. II
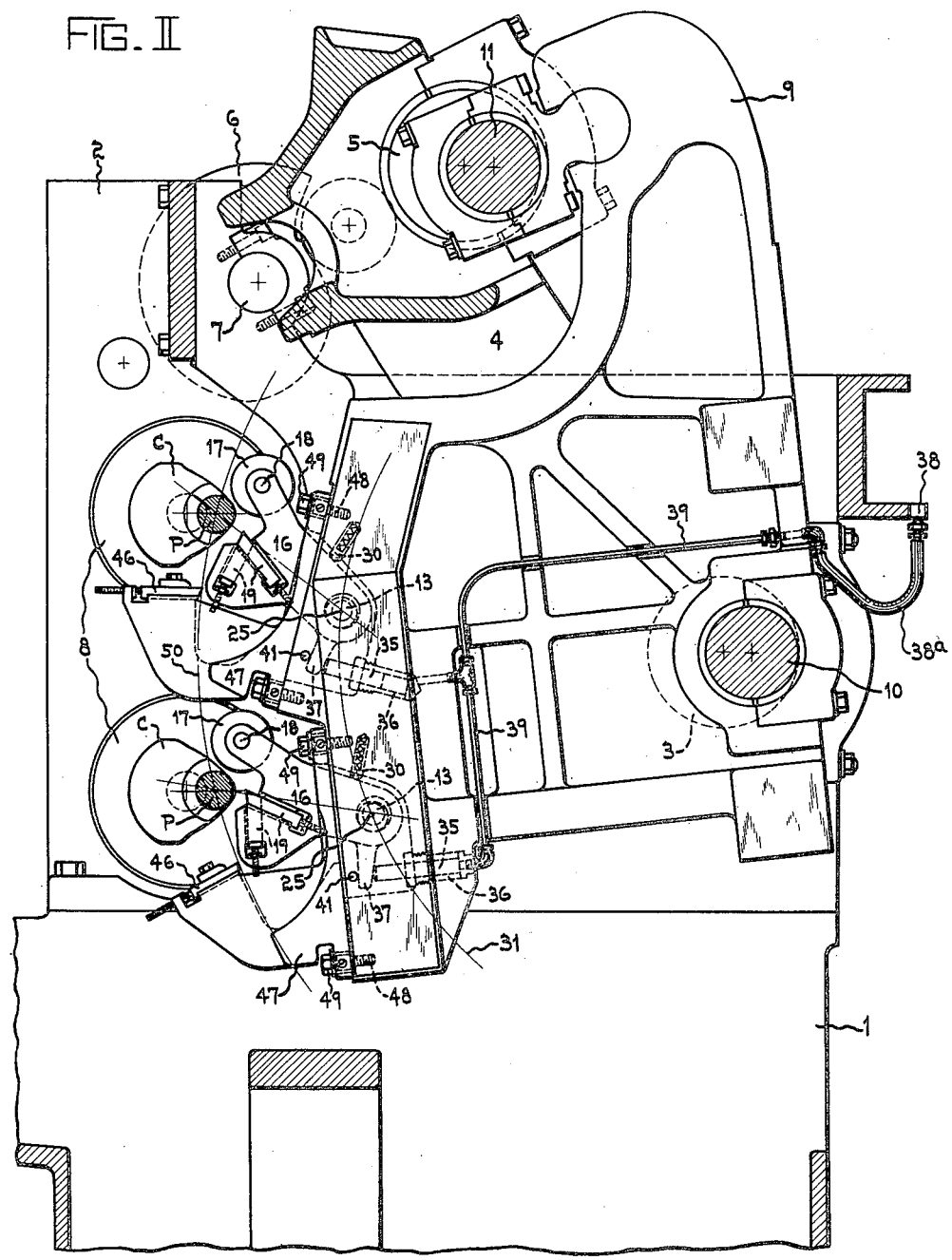
WITNESS.
Orlando S. Knox
INVENTOR.
WILLIAM F. GROENE
BY Willard L. Groene
ATTORNEY.

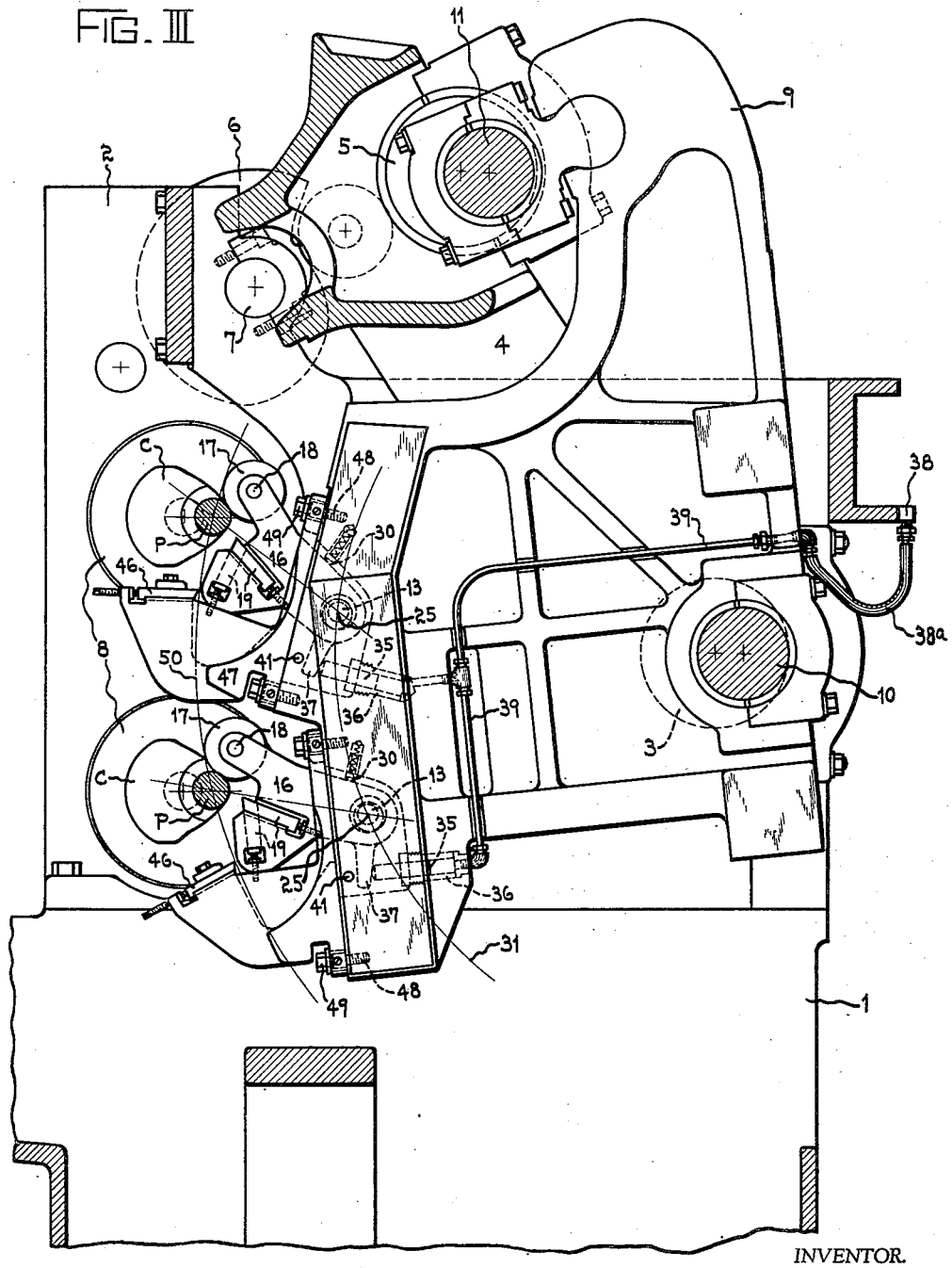

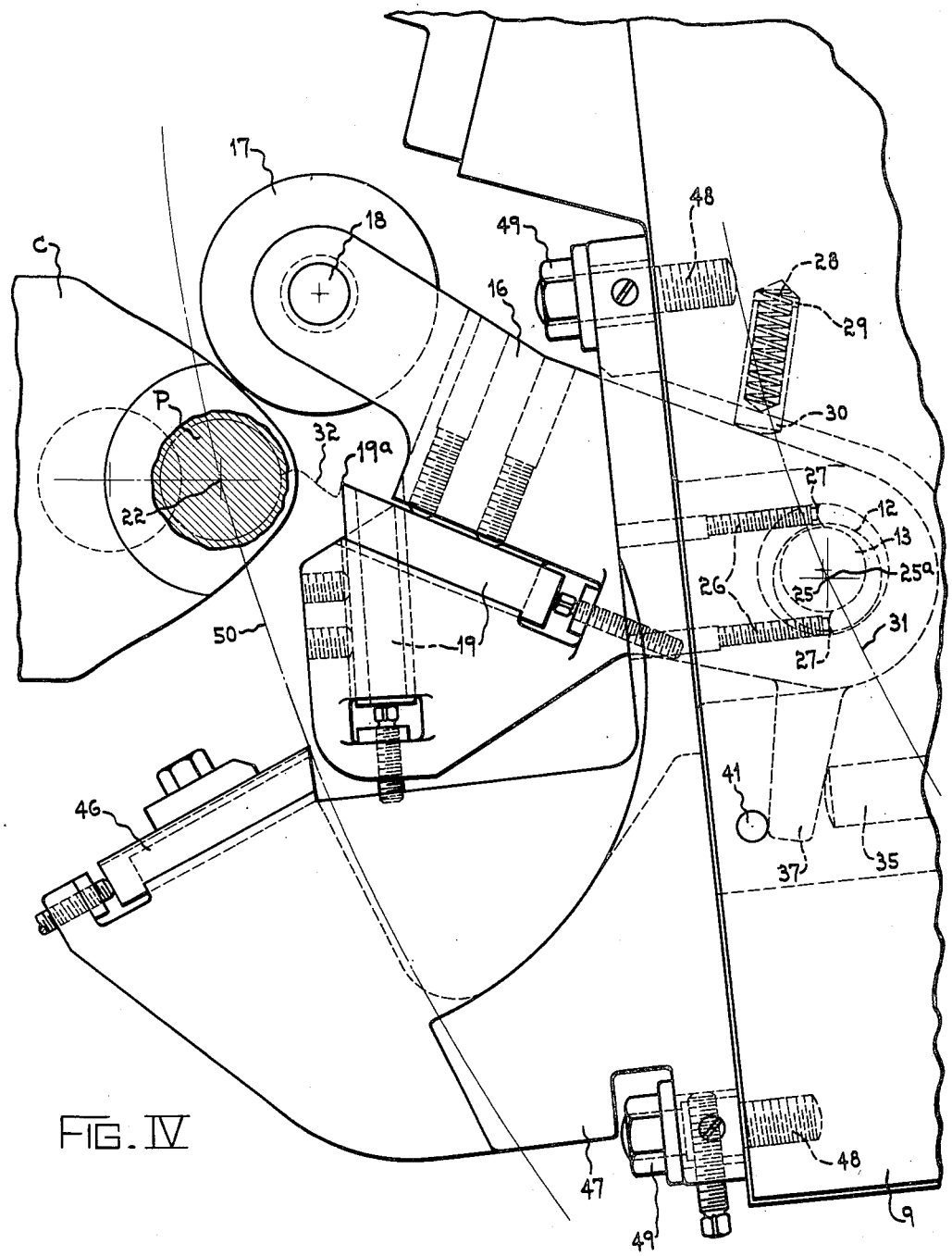

March 4, 1941.　　　W. F. GROENE　　　2,233,977
TOOL FEEDING MECHANISM FOR LATHES
Filed July 24, 1939　　　10 Sheets-Sheet 5
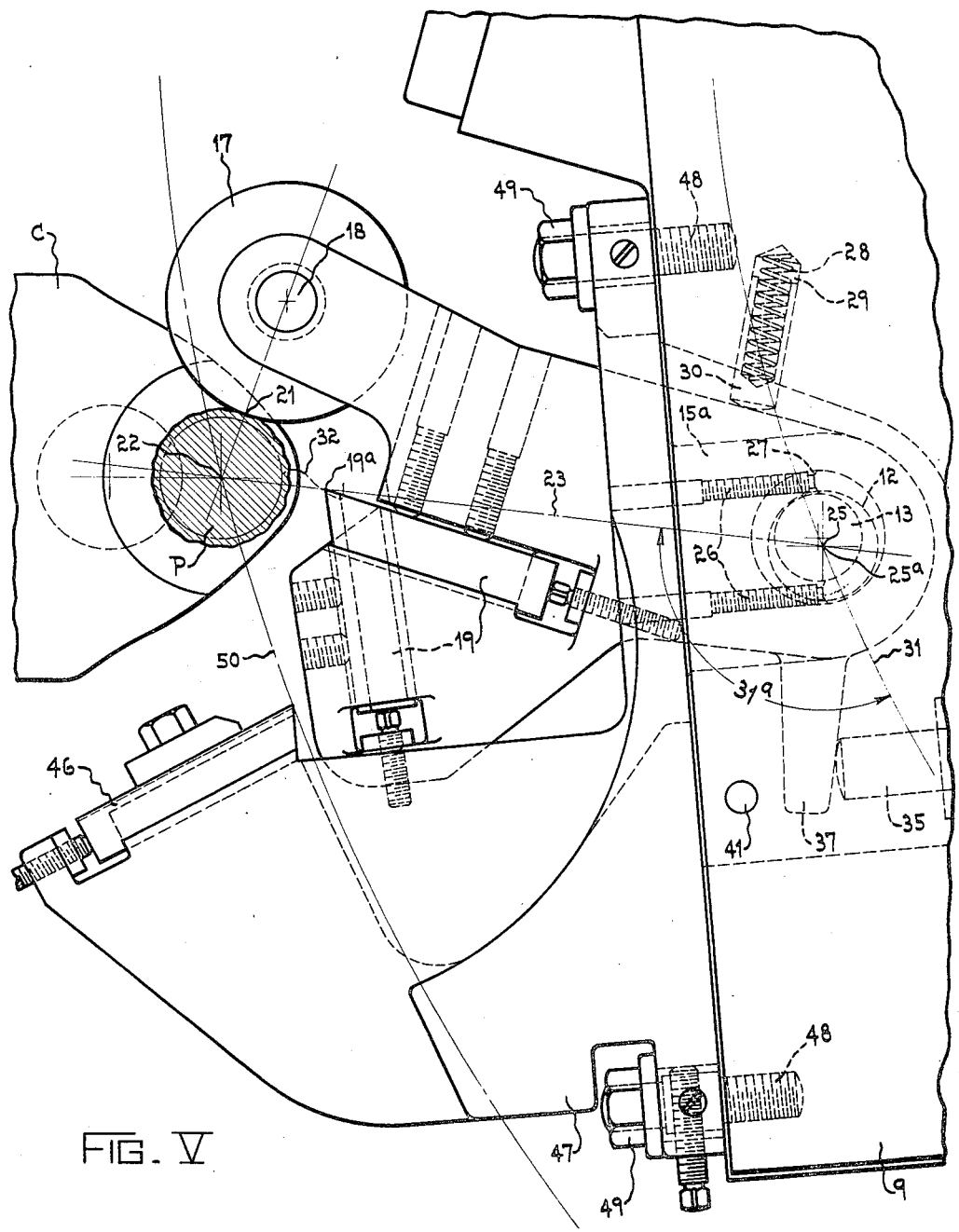
FIG. V
WITNESS.
Orlando S. Knox
INVENTOR.
WILLIAM F. GROENE
BY Willard S. Groene
ATTORNEY.

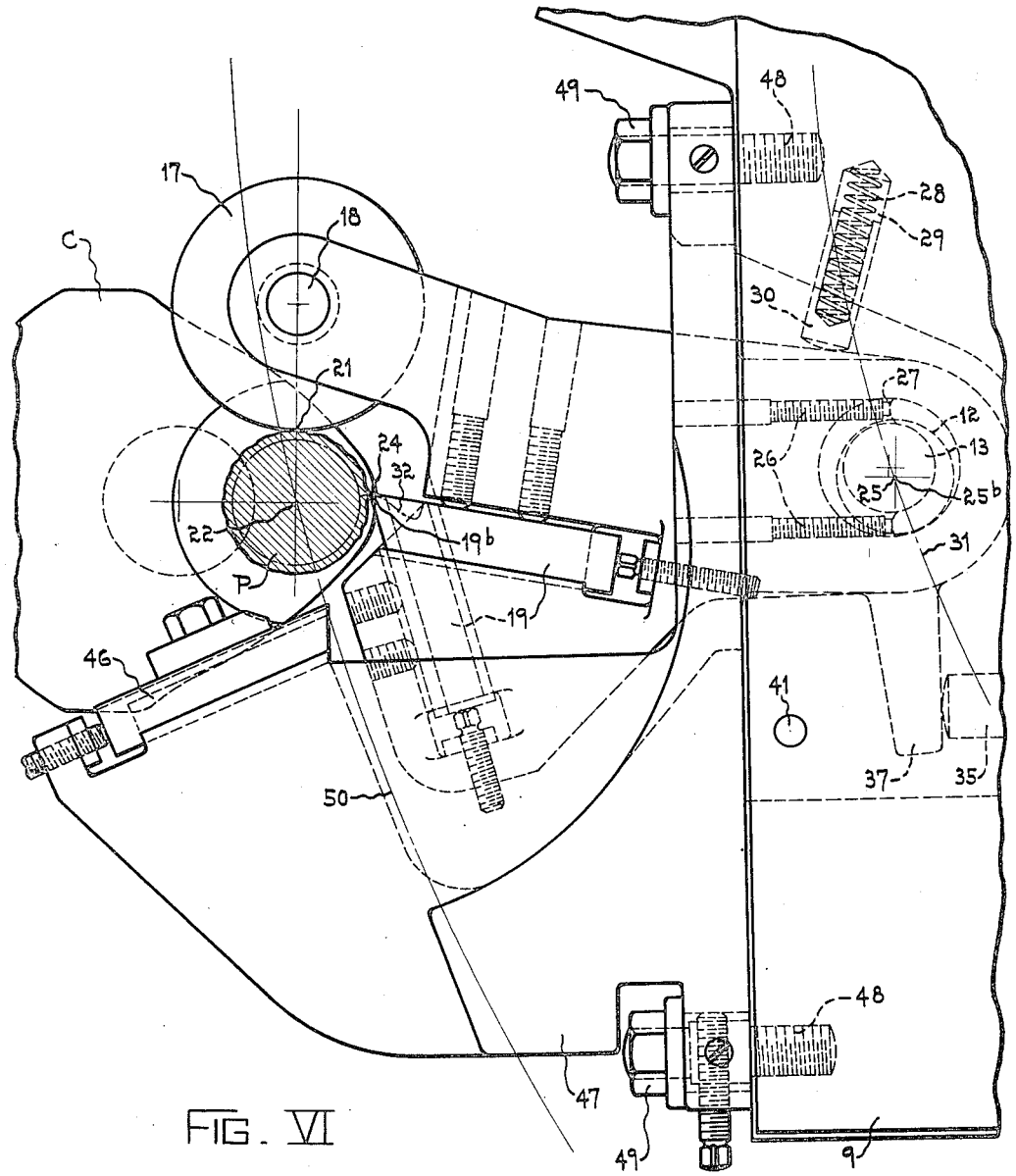

March 4, 1941.  W. F. GROENE  2,233,977
TOOL FEEDING MECHANISM FOR LATHES
Filed July 24, 1939  10 Sheets-Sheet 7
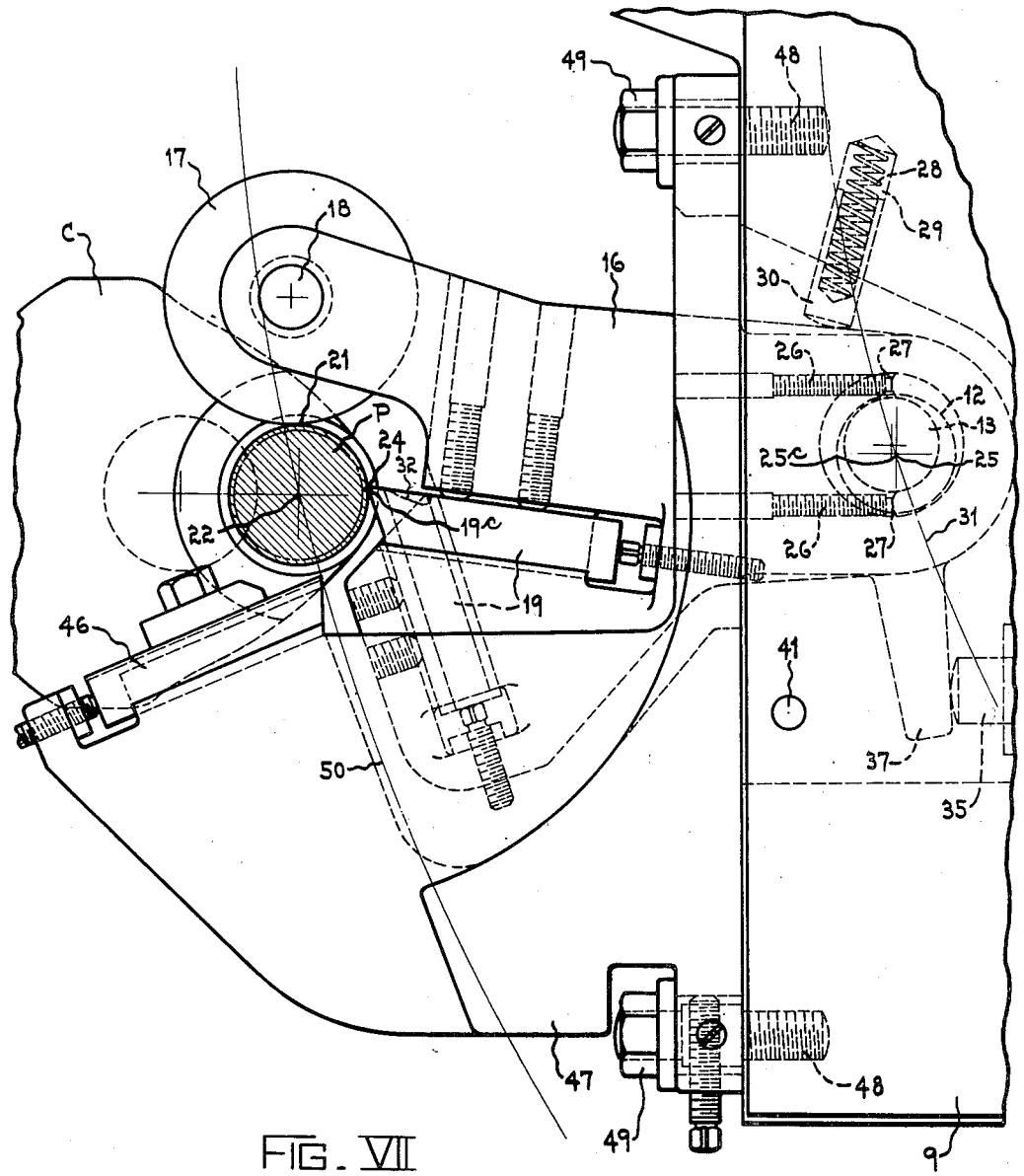
FIG. VII
WITNESS.
Orlando S. Knox
INVENTOR.
WILLIAM F. GROENE
BY Willard S. Groene
ATTORNEY.

March 4, 1941.  W. F. GROENE  2,233,977
TOOL FEEDING MECHANISM FOR LATHES
Filed July 24, 1939  10 Sheets-Sheet 8
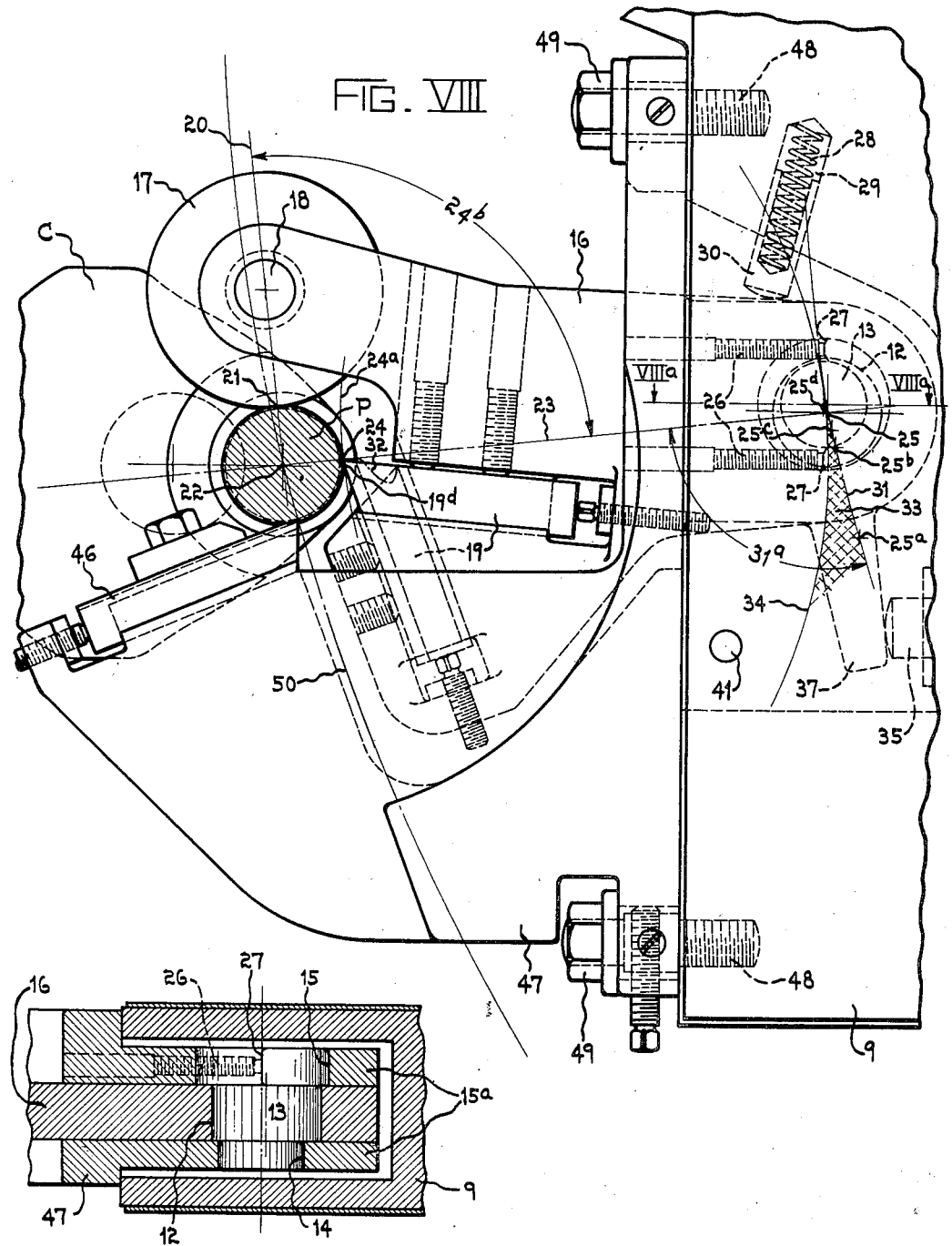
WITNESS.
Orlando S. Knox
INVENTOR.
WILLIAM F. GROENE
BY Willard L. Groene
ATTORNEY.

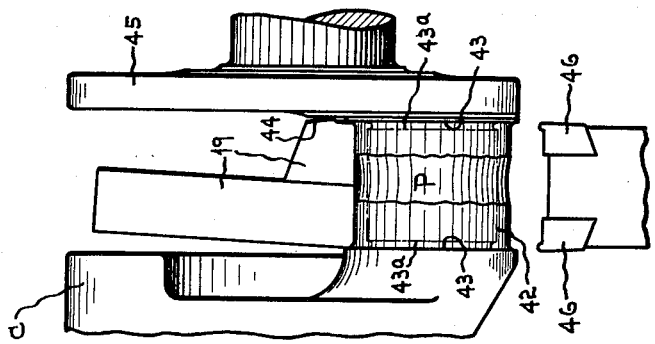
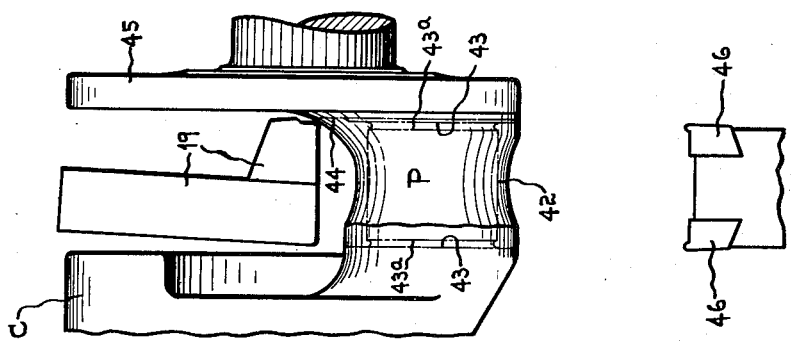
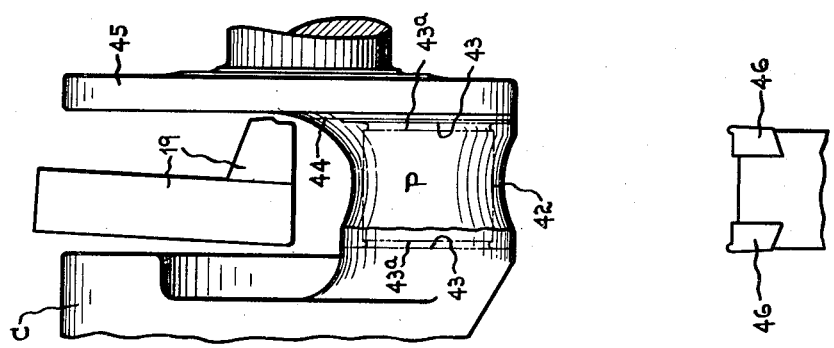

March 4, 1941. W. F. GROENE 2,233,977
TOOL FEEDING MECHANISM FOR LATHES
Filed July 24, 1939 10 Sheets-Sheet 10
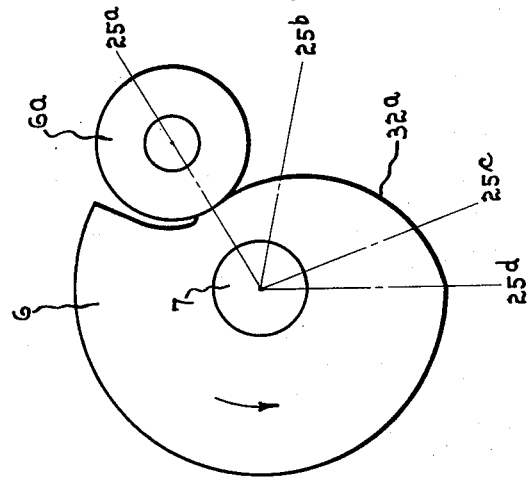
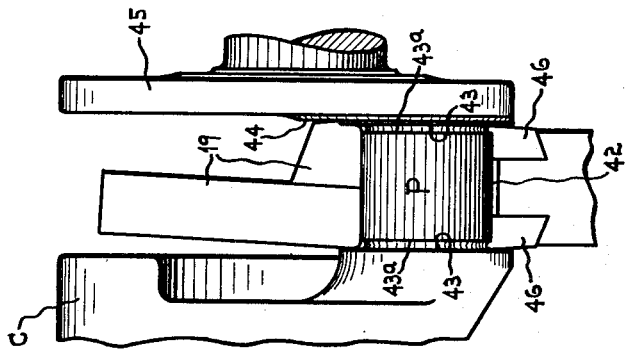
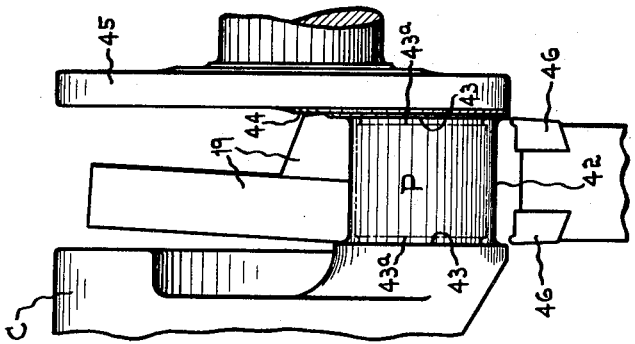
WITNESS.
Orlando S. Knox
INVENTOR.
WILLIAM F. GROENE
BY Willard S. Groene
ATTORNEY.

Patented Mar. 4, 1941

2,233,977

UNITED STATES PATENT OFFICE 2,233,977

TOOL FEEDING MECHANISM FOR LATHES

William F. Groene, Cincinnati, Ohio, assignor to The R. K. Le Blond Machine Tool Company, Cincinnati, Ohio, a corporation of Delaware Application July 24, 1939, Serial No. 286,150

21 Claims. (Cl. 82—9)

This invention pertains to tool feeding mechanism for lathes, particularly for orbital multiple spindle crank pin turning lathes in which the difficult problem of simultaneously turning all of the pin bearings on a plurality of crankshafts at one time is to be accomplished. More specifically this invention pertains to the method of feeding a tool holder which rests upon the work piece being turned and has tangential floating movement relative to the work surface being machined.

Another object of this invention is to provide in a tool holder of this type a method of feeding it so as to provide a powerful toggle action feeding for the cutting tools of such tool holders.

Another object of this invention is to provide a way of feeding such tool holders so that a variable decreasing rate of feeding of the tool relative to the work is provided while the primary feeding element is operating at relatively rapid and uniform feeding speed.

A still further object of this invention is to provide an arrangement for feeding the above type of tool holder so that an automatic dwell is provided at the completion of the turning cycle without the necessity of providing the feeding source of power for the feeding element with a stop, so that its motion may continue even though the automatic dwell is effected at the proper time.

Another object of this invention is to provide for carrying a pivotally mounted tool holder on a tool carrying frame which frame is actuated to feed the tool holder relative to the work and which has means incorporated in it for automatically moving said tool holder to and from engagement with the work to be turned at the completion of the cutting to facilitate loading and unloading of work in the work holders of the lathe in which it is incorporated.

Another object is to provide, in conjunction with a tool holder having tangential floating movement relative to a work piece being turned, means for initially engaging said tool holder with the work and also to provide hydraulic vibration damping means cooperating with said tool holder to restrain its tangential floating movement to thereby eliminate vibration and chatter so as to produce a work surface of high accuracy and finish.

Another object is to provide in conjunction with a tool holder having tangential floating movement relative to a work piece being turned a tool carrying frame for carrying said tool holder and also a finishing set of tools which are fixedly mounted on said tool carrying frame and operated simultaneously with said tools in the floating tool holders so that both simultaneously operate on the work piece to completely finish it to a high degree of accuracy and finish.

Another object of this invention is to provide a floating tool holder resting upon the work piece which is carried on a tool carrying and feeding frame and also to provide a series of finishing tools fixed on said frame and operating in conjunction with said tool holder whereby the cutting action and forces of said fixed tool holder is absorbed by the floating tool holder resting upon the work piece so as to prevent any distortion or displacement of the work piece being turned in the lathe.

It is also an object to provide the above arrangement in conjunction with the difficult problem of simultaneously turning a plurality of crank pins on a plurality of crankshafts at one time in an orbital lathe.

Further features and advantages of this invention will appear from the following detailed description of the drawings in which:

Figure I is a vertical transverse section through a multiple spindle orbital lathe showing the application of my invention thereto, the cutting tools being shown fed to depth on the crank pins of the crankshafts being turned in said lathe at the end of the cutting cycle.

Figure II is a vertical transverse section through the lathe as in Figure I but showing the tools fully retracted from the work crankshafts for loading and unloading from the lathe.

Figure III is a vertical transverse section through the lathe as in Figure I but showing the tools at the beginning of the cutting cycle.

Figure IV is an enlarged view of a portion of the cutting tools and work shown in Figure II.

Figure V is an enlarged view of a portion of the cutting tools and work shown in Figure III.

Figure VI is an enlarged view similar to that of Figure V but showing the cutting tools at the beginning of the machining of the crank pin diameter.

Figure VII is an enlarged view similar to that of Figure V but showing the cutting tools at the beginning of cutting action of the finishing tools.

Figure VIII is an enlarged view of a portion of the cutting tools and work shown in Figure I.

Figure VIIIa is a section through the eccentric mounting means for the tool holder on the line VIIIa—VIIIa of Figure VIII.

Figure IX is a diagrammatic view showing the relationship of the work and tools as shown in Figure IV.

Figure X is a diagrammatic view showing the relationship of the work and tools as shown in Figure V.

Figure XI is a diagrammatic view showing the relationship of the work and tools as shown in Figure VI.

Figure XII is a diagrammatic view showing the relationship of the work and tools as shown in Figure VII.

Figure XIII is a diagrammatic view showing the relationship of the work and tools as shown in Figure VIII.

Figure XIV shows the construction of the feeding cam for actuating the cutting tools in feeding motion relative to the work.

For illustrative purposes this invention is shown applied to a multiple spindle orbital lathe primarily because this shows its application to one of the most difficult conditions to be met with in metal turning and which application best illustrates the ability with which this invention meets the stringent requirements of turning crank pins of a plurality of crankshafts at one time. It is understood, however, that this invention is not limited to this type of lathe and may be applied in any kind of lathe wherein work is to be rapidly and accurately machined.

Noting particularly Figure I, the machine here illustrated comprises a base 1 upon which is mounted the housing 2. A master crankshaft 3 is journaled in the housing 2 and a feeding cradle 4 is mounted to swing the master crankshaft 5 about the master crankshaft 3. Feeding cams 6 carried on the cam shaft 7 in the housings 2 actuate the cradle 4 in feeding movements. Work holders 8 are journaled in the housings 2 and are driven in synchronism with the master crankshafts 3 and 5. This arrangement will not be here described in greater detail as it is fully described in Patent 2,138,964 dated December 6, 1938, the tool carrying frame 9, as actuated in feeding movement by the cradle 4, being considered the feeding member.

The orbitally moving tool carrying frame 9 is mounted on the crank pin 10 of the master crankshaft 3 and on the crank pin 11 of the master crankshaft 5. Mounted to swing on the eccentric portions 12 (Figure VIIIa) of the eccentric studs 13 which are journaled in bores 14 and 15 of the integral lugs 15a of the tool block 47 fixed on the tool carrying frame 9, are the tool holders 16 which have rollers 17 resting on the work piece (in this case the crank pin P of the crankshaft C) to be machined in the lathe and being journaled on a suitable pin 18 fixed in the tool holder. Cutting tools 19 are appropriately fixed in the tool holders 16 so as to engage the work at a point substantially 90° around the periphery of the work from the point of engagement of the roller 17 with the work. More specifically, this tool holder should be arranged so that the angle between the line 20 passing through the point of contact 21 of the roller (or equivalent such as a hardened shoe) and the axis 22 of the work or crank pin being turned and the line 23 passing through this axis 22 and the cutting edge 24 of the tools 19 as indicated by the angle 24b should be about 90° (Figure VIII). It is also important that the axis of swinging 25 of the tool holder 16 on the orbital tool carrying frame be located substantially on the line 23. By this arrangement tangential floating movement is effected along the line 24a for the cutting edge 24 of the cutting tools 19 relative to the surface of the work P being turned.

By manipulating the adjusting screws 26 threaded in the lugs 15a which engage the lugs 27 of the eccentric stud 13 so that it may be carefully rotated in either direction in the bores 14 and 15 the object of which is to provide adjustment between the point 25 and thus the cutting edge 24 of the tools relative to the axis 22 of the work being turned. This provides the means for accurately setting the tools for proper sizing of the work diameters. A compression spring 28 bearing against the bottom of the bore 29 in the tool carrying frame 9 and pushing against the plunger 30 which engages the tool holder 16 serves to maintain engagement of the roller 17 with the surface of the work piece being turned.

In the past it has always been considered necessary to move the axis of swinging 25 of the tool holder 16 radially of the axis 22 of the work being turned, that is along the line 23, in order to effect the proper cutting action for the tools and to maintain the proper stroke and index of the crank pins P of crankshafts C when used for orbital turning. I have discovered, however, that it is possible to effect proper feeding of the tools and maintain proper stroke and index of the crank pins by departing completely from this old method of feeding by moving the axis of swinging 25 in feeding motion substantially perpendicular to the line 23, this is, in this particular example, along the arcuate path of feed travel 31 (Figure VIII). In other words in my invention I propose to move the axis of swinging 25 of the tool holder substantially perpendicular to the line passing through this axis, the cutting edge of the tools, and the axis of the work being turned to effect feeding of the tools relative to the work, that is, so that the angle 31a between the line 23 and the line of feeding 31 is substantially 90°. Expressed in another way, I propose to effect feeding of the cutting tools of the tool holder by feeding it substantially parallel to its line of tangential movement 24 relative to the work surface being turned.

Not only does this new method of feeding perform very satisfactorily but it also has certain distinct advantages over former devices as follows:

(a) A powerful toggle feeding motion is provided for the cutting tools which greatly relieves the feeding mechanism of strain.

(b) A variable decreasing rate of feed is provided for the cutting tools with a uniform rate of feeding movement of the orbital tool carrying frame or other feeding means.

(c) An automatic dwell is provided for the tools without difficulty of accurately arresting the feeding motion of the orbital tool carrying frame or other feeding means.

(d) Ability to accurately set depth of cut independent of the position feeding mechanism, the feeding mechanism constantly following a path always maintained in the same definite relationship to the work piece being turned.

The action of the tool holder 16 as it is fed to the work is best illustrated by reference to the series of Figures V, VI, VII, and VIII which show successive stages of feeding of the tools to the work. Reference may also be made to the corresponding Figures IX, X, XI, and XII. In Figure V the tool holder is shown at the beginning of the cutting cycle with the axis of swinging at 25a on the line of feeding 31. As the orbital tool carrying frame 9 swings upwardly the axis 25 moves upwardly along the line of feeding 31 through the successive points 25b, 25c, reaching the point 25d shown in Figure VIII. It can be clearly seen (Figure VIII) that the line of feeding 31 through which the axis 25 travels is substantially parallel with the tangential floating movement of the tools 19 as indicated by the line 24a. It can be further seen that this line of feeding 31 is substantially perpendicular to the line 23 so that the angle 31a is around 90°. The movement of the axis 25 in line of feeding 31 is affected by swinging the orbital tool carrying unit 9 about the crank pin 10 of the master crankshaft 3 (Figure I) in a manner fully described in Patent 2,138,964. However, it is apparent that this invention is not limited to this particular type of line of feeding. For instance a straight line of feeding or any equivalent line of feeding which meets the particular requirements herein set forth would be equally satisfactory in carrying out this invention.

Powerful toggle action feeding is thus effected in the tool holder 16 since the distance of travel of the axis of swinging 25 from 25a to 25d is much greater than the travel of the cutting edge 24 of the tools from 19a (Figure V) to 19d (Figure VIII), the cutting edge 24 of these tools following the path indicated by the line 32. Thus feeding strains are greatly relieved from the orbital tool carrying frame 9 by this differential movement between it and the tool holder 16.

It is to be further noted that a variable decreasing rate of feeding of the tools 19 to the work is automatically effected with uniform rate of feeding of the orbital tool carrying frame 9 by the feeding cam 6 engaging the cam roller 6a of the cradle 4 (Figure XIV) which need only have a simple relatively fast constant rise portion 32a to properly feed the tools when using my invention instead of a complex contour difficult to machine accurately and which does not perform with proper accuracy when exceedingly slow rises are utilized on its periphery resulting in chatter in the feeding mechanism and inaccuracies in the finished work surface dimensions. This effect is produced by arranging the line of feeding 31 so that the angle 31a when the axis 25 is at 25a is somewhat more than 90° and decreases until it is practically 90° when the axis 25 reaches the point 25d, at which point motion of the axis 25 in the line of feeding 31 does not move the cutting edge 24 of the tools relative to the work. Thus the rate of feed at the point 25d reaches infinity which rate results in the dwell of the tools on the work at this time for final sizing. This condition is further illustrated by the cross hatched wedge-shaped area 33 between the line 31 and line 34 which represents a constant distance for the axis 22 to point 25d, showing how this area decreases to a sharp-point as the axis 25 is moved from point 25a to point 25d. The slope of the line 34 relative to the line 31 indicates the rate of decreasing feed for a given point of the axis 25 on the line 31. The merging of these lines 31 and 34 indicates no feed or in other words the dwell period when the axis 25 reaches the point 25d.

Another novel feature in connection with these tool holders 16 is an arrangement for swinging these tool holders from engagement with the work piece, as shown in Figure IV, so as to facilitate unloading and loading work in the work holders 9. This mechanism comprises the plungers 35 which are slidably carried in suitable cylinders 36 in the orbital tool carrying frame 9 and engage integral downwardly extending arms 37 of the tool holders so that when fluid pressure from the manifold 38, which is connected to a suitable source of fluid pressure, is delivered through the flexible hose 38a and the lines 39 and 40 to these cylinders 36 the plungers 35 will be forced outwardly to rotate the tool holders from the position shown in either Figures V or VIII to the position shown in Figure IV, thus removing the tool holders from engagement with the work piece P. At this time the fluid pressure applied in the cylinders 36 is sufficient to overcome the pressure of springs 28 and to move the arms 37 of the tool holder up against the stop pins 41 fixed in the unit 9.

Another important function of these plungers 35 is that of damping vibration in the tool holders 16 during the cutting cycle as shown in Figures I, III, V, VI, and VII. Moderate fluid pressure, insufficient to overcome the pressure of the springs 28, is constantly maintained in these cylinders 36 so that the plungers 35 constantly yieldingly bear against the arms 37 of the tool holders 16 during the cutting operation of the tools 19. It is found that by this arrangement all chattering and vibration in the tool holders 16 is effectively eliminated so as to produce work of a high degree of accuracy and finish.

In conjunction with the cutting tools 19 which, in this particular exemplary disclosure, are used to rough out the diameter 42 and fillet walls 43 of the crank pin P and cheek the side 44 of the web 45 (Figure XIII), I provide finishing tools 46 carried in a tool block 47 fixed on the orbital tool carrier 9 by means of the studs 48 and nuts 49, which finish face the fillet walls 43 and neck the fillets 43a in the crank pin diameter 42. It will be noted that these tools 46 are arranged to feed along the line 50 which, in this particular illustration, is concentric with the arcuate line of feeding 31 discussed above, the object being to effect feeding motion of these tools 46 in a direction substantially parallel to the direction of feeding of the axis of swinging 25 of the tool holder 16. This arrangement makes possible the simultaneous application of both sets of tools 19 and 46 to the work piece so as to require a minimum of time to fully complete the work, both sets of tools finishing their work at the same instant shown in Figures VIII and XIII. It will be noted that by this arrangement the cutting force exerted by the tools 46 along the line 50 will be neutralized by the pressure of the roller 17, which engages the work substantially diametrically opposite the point of engagement of the tools 46 with the work, during the cutting cycle of the cutting tools of the lathe to thereby greatly aid in relieving strain from the work piece during the final sizing of the work to accurate dimensions.

Having fully set forth and described my invention what I claim and desire to secure by United States Letters Patent is:

1. In a tool feeding mechanism for lathe, a feeding member, a tool holder pivotally mounted on said feeding member and floatingly supported on a work piece to be machined in said lathe, a tool in said tool holder, said tool holder being arranged to effect tangential floating movement of the cutting edge of said tool relative to the work surface being turned on said work piece, and means for actuating said feeding member so as to move the axis of said pivotal mounting of the tool holder in a direction substantially parallel with the direction of tangential floating movement of said tool to effect a cutting action of said tool on said work piece.

2. In a tool feeding mechanism for lathe, a feeding member, a tool holder, mounting means for said tool holder on said feeding member arranged to effect tangential floating movement of the cutting edge of a tool in said tool holder relative to a work surface being machined by said tool on a work piece in said lathe, and means for actuating said feeding member so as to move said mounting means substantially parallel to the direction of said tangential floating movement to effect a cutting action of said tool on said work piece.

3. In a tool feeding mechanism for lathe, a feeding member, a tool holder, pivotal mounting means for said tool holder on said member, a work engaging portion on said tool holder, a cutting tool on said tool holder adapted to engage a work piece in said lathe at a point substantially 90° circumferentially removed from the point of contact of said work engaging portion of said tool holder with the work, and means for actuating said feeding member for moving said pivotal mounting means in a direction substantially perpendicular to the line of feeding of said tool relative to said work piece.

4. In a tool feeding mechanism for lathe, a feeding member, a tool holder, mounting means for said tool holder on said member permitting tangential floating movement of a tool in said tool holder, a work engaging portion on said tool holder adapted to engage a work piece in said lathe at a point substantially 90° circumferentially removed from the point of engagement of said tool with said work, and means for actuating said feeding member for moving said mounting means in a direction substantially perpendicular to the line of feeding of said tool relative to said work piece.

5. In a tool feeding mechanism for lathe, a feeding member, a tool holder, means for pivotally mounting said tool holder on said member, a work engaging portion on said tool holder, a tool in said tool holder having its cutting edge lying substantially on a line passing through the axis of rotation of a work piece to be machined in said lathe, and the axis of said pivotal mounting, and means for actuating said feeding member to move said axis of said pivotal mounting substantially perpendicular to said line.

6. In a tool feeding mechanism for lathe, a feeding member, a tool holder, means for pivotally mounting said tool holder on said member, a work engaging portion on said tool holder, contacting a work piece in said lathe at a point substantially 90° circumferentially removed from the point of contact of a tool in said tool holder having its cutting edge lying substantially on a line passing through the axis of rotation of a work piece to be machined in said lathe and the axis of said pivotal mounting, and means for actuating said feeding member to move said axis of said pivotal mounting substantially perpendicular to said line.

7. In a tool feeding mechanism for lathe, a feeding member, a tool holder, mounting means for said tool holder on said feeding member arranged to effect tangential floating movement of a tool in said work holder relative to a work surface being machined by said tool on a work piece in said lathe, a work engaging portion on said tool holder, resilient means for effecting engagement of said portion with said work piece, and means for actuating said feeding member so as to move said mounting means substantially parallel to the direction of said tangential floating movement to effect a cutting action of said tool on said work piece.

8. In a tool feeding mechanism for lathe, a feeding member, a tool holder, mounting means for said tool holder on said feeding member arranged to effect tangential floating movement of a tool in said work holder relative to a work surface being machined by said tool on a work piece in said lathe, a work engaging portion on said tool holder, means for moving said tool holder to remove its work engaging portion from the work piece, and means for actuating said feeding member so as to move said mounting means substantially parallel to the direction of said tangential floating movement to effect a cutting action of said tool on said work piece.

9. In a tool feeding mechanism for lathe, a feeding member, a tool holder, mounting means for said tool holder on said feeding member arranged to effect tangential floating movement of a tool in said work holder relative to a work surface being machined by said tool on a work piece in said lathe, a work engaging portion on said tool holder, resilient means for effecting engagement of said portion with said work piece, means for moving said tool holder to remove its work engaging portion from the work piece, and means for actuating said feeding member so as to move said mounting means substantially parallel to the direction of said tangential floating movement to effect a cutting action of said tool on said work piece.

10. In a tool feeding mechanism for lathe, a feeding member, a tool holder mounted on said feeding member and floatingly supported on a work piece in said lathe, a cutting tool in said tool holder, vibration damping means on said feeding member acting on said tool holder to restrict free floating movement in said tool holder, and means for actuating said feeding member to effect a cutting action of said tool on said work.

11. In a tool feeding mechanism for lathe, a feeding member, a tool holder mounted on said feeding member and floatingly supported on a work piece in said lathe, resilient means for maintaining said tool holder in engagement with said work piece, a cutting tool in said tool holder, vibration damping means on said feeding member acting on said tool holder to restrict free floating movement in said tool holder, and means for actuating said feeding member to effect a cutting action of said tool on said work.

12. In a tool feeding mechanism for lathe, a feeding member, a tool holder mounted on said feeding member and floatingly supported on a work piece in said lathe, resilient means for maintaining said tool holder in engagement with said work piece, a cutting tool in said tool holder, means on said feeding member acting on said tool holder to restrict free floating movement in said tool holder during the cutting action of said tool on the work and to remove said tool holder from engagement with the work at the completion to said cutting action, and means for actuating said feeding member to effect the cutting action of said tool on said work.

13. In a tool feeding mechanism for lathe, a feeding member, a tool holder mounted on said feeding member and floatingly supported on a work piece in said lathe, resilient means for maintaining said tool holder in engagement with said work piece, a cutting tool in said tool holder, fluid pressure means on said feeding member acting on said tool holder with relatively low pressure to restrict free floating movement in said tool holder during the cutting action of said tool on the work and operating with relatively high pressure to remove said tool holder from engagement with the work, and means for actuating said feeding member to effect the cutting action of said tools on said work.

14. In a tool feeding mechanism for lathe, a feeding member, a tool holder, mounting means for said tool holder on said member permitting tangential floating movement of a tool in said tool holder relative to a work surface to be machined on a work piece in said lathe, a work engaging portion on said tool holder adapted to engage a work piece in said lathe at a point substantially 90° circumferentially removed from the point of engagement of said tool with said work, a second cutting tool fixed on said feeding member engaging said work surface substantially diametrically opposite the point of contact of said work engaging portion with said work piece, and means for actuating said feeding member to move said mounting means in a direction substantially parallel with said line of tangential floating movement to effect a simultaneous feeding of both of said tools relative to said work piece.

15. In a tool feeding mechanism for lathe, a feeding member, a tool holder pivotally mounted on said feeding member and floatingly resting on a work piece to be machined in said lathe, a tool in said tool holder, said tool holder being arranged to effect tangential floating movement of said tool relative to the work surface being turned on said work piece, a second tool fixed on said feeding member, and means for actuating said feeding member so as to move the axis of said pivotal mounting and the cutting edge of said second tool in a direction substantially parallel with the direction of tangential floating movement of said tool to effect simultaneous cutting action of said tool on said work piece.

16. In a feeding mechanism for lathe, a tool holder floatingly supported on a work piece in said lathe, a cutting tool in said tool holder, a second tool holder, a second tool in said second tool holder, a common feeding member floatingly carrying said first mentioned tool holder and fixedly carrying said second tool holder, and means for actuating said feeding member in a path of feeding to effect simultaneously operation of said tools on said work piece.

17. In an orbital lathe, a rotary work holder, a pair of master crankshafts, means for rotating said work holder and master crankshafts in synchronism, an orbitally moving tool carrying frame mounted on said crankshafts, a tool holder, mounting means for said tool holder on said frame arranged to effect tangential floating movement of a tool in said tool holder relative to a work surface being machined by said tool on a work piece in said work holder, and means for moving said frame so as to move said mounting means substantially parallel to the direction of said tangential floating movement to effect feeding of said tool to said work piece.

18. In an orbital lathe, a rotary work holder, a pair of master crankshafts, means for rotating said work holder and master crankshafts in synchronism, an orbitally moving tool carrying frame mounted on said crankshafts, a tool holder, mounting means for said tool holder on said frame arranged to effect tangential floating movement of a tool in said tool holder relative to a work surface being machined by said tool on a work piece in said work holder, a second tool holder having a tool fixed on said frame, and means for moving said frame so as to move said mounting means and the cutting edge of said second mentioned tool substantially parallel to the direction of said tangential floating movement to effect feeding of said tool to said work piece.

19. In an orbital lathe, a frame, a pair of rotary work holders journaled in said frame, a master crankshaft journaled in said frame, a feeding cradle pivotally mounted about said crankshaft, a second master crankshaft journaled in said cradle, an orbital tool carrier journaled on crank pins of said master crankshafts, tool holders with tools pivotally mounted on said carrier and floatingly supported on work pieces in said work holders, and means for actuating said feeding cradle to effect arcuate feeding of the axes of said mountings substantially concentric with the paths of floating movement of said tools in said tool holders.

20. In an orbital lathe, a frame, a pair of rotary work holders journaled in said frame, a master crankshaft journaled in said frame, a feeding cradle pivotally mounted about said crankshaft, a second master crankshaft journaled in said cradle, an orbital tool carrier journaled on crank pins of said master crankshafts, tool holders with tools pivotally mounted on said carrier and floatingly supported on work pieces in said work holders, tool holders with tools fixed on said carrier, and means for actuating said feeding cradle to effect arcuate feeding of the axes of said mountings and the cutting edges of said second mentioned tools in paths substantially concentric with each other and with the paths of floating movement of said tools in said tool holders.

21. In a tool feeding mechanism for lathe, a feeding member, a tool holder pivotally mounted on an eccentric stud on said feeding member and floatingly supported on a work piece to be machined in said lathe, a tool in said tool holder, said tool holder being arranged to effect tangential floating movement of said tool relative to the work surface being turned on said work piece, means for actuating said feeding member so as to move the axis of pivoting of the tool holder on said member in a direction substantially parallel with the direction of tangential floating movement of said tool to effect a cutting action of said tool on said work piece, and means for rocking said eccentric stud to effect accurate setting of said tool relative to said work piece.

WILLIAM F. GROENE.